(12) United States Patent  
Keating et al.

(10) Patent No.: US 12,348,518 B2
(45) Date of Patent: *Jul. 1, 2025

(54) MANAGING OPERATOR PATTERN SERVICE CONNECTIONS TO AN ENVIRONMENT

(71) Applicant: Red Hat, Inc., Raleigh, NC (US)

(72) Inventors: Aiden Keating, Waterford (IE); Ciaran Roche, Waterford (IE); Dimitria Stefania Zuccarelli, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/364,924

(22) Filed: Aug. 3, 2023

(65) Prior Publication Data

US 2023/0379330 A1 Nov. 23, 2023

Related U.S. Application Data

(63) Continuation of application No. 17/106,411, filed on Nov. 30, 2020, now Pat. No. 11,743,259.

(51) Int. Cl.
*H04L 9/40* (2022.01)
*G06F 9/455* (2018.01)
*G06F 9/48* (2006.01)

(52) U.S. Cl.
CPC .......... *H04L 63/10* (2013.01); *G06F 9/45558* (2013.01); *G06F 9/4881* (2013.01); *H04L 63/20* (2013.01)

(58) Field of Classification Search
CPC ... G06F 9/4881; G06F 9/45558; H04L 63/20; H04L 63/10; H04L 63/102
See application file for complete search history.

(56) References Cited

U.S. PATENT DOCUMENTS

| | | |
|---|---|---|
| 10,142,288 B1 | 11/2018 | Mavor et al. |
| 10,394,849 B2 | 8/2019 | Nair et al. |
| 10,565,092 B2 | 2/2020 | Benes et al. |
| 10,623,269 B2 | 4/2020 | Fawcett |
| 11,032,280 B1 | 6/2021 | Chhabra et al. |
| 2015/0135305 A1 | 5/2015 | Cabrera et al. |
| 2016/0132214 A1 | 5/2016 | Koushik et al. |
| 2016/0134616 A1 | 5/2016 | Koushik et al. |
| 2018/0063089 A1* | 3/2018 | Moysi ................. G06F 16/2456 |
| 2018/0095997 A1* | 4/2018 | Beveridge ............... H04L 47/70 |
| 2019/0327271 A1 | 10/2019 | Saxena et al. |
| 2020/0136930 A1 | 4/2020 | Szulman et al. |
| 2020/0142810 A1* | 5/2020 | Zingade .............. G06F 11/3684 |

(Continued)

OTHER PUBLICATIONS

Jared Watts, "Crossplane as an OpenShift Operator to manage and provision cloud-native services," May 26, 2020, https://blog.crossplane.io/crossplane-openshift-operator-cloud-native-services/.

*Primary Examiner* — Frantz B Jean
(74) *Attorney, Agent, or Firm* — Womble Bond Dickinson (US) LLP

(57) ABSTRACT

A method determining whether the operator pattern service has permission to perform an operation on a state of a computing environment. The method further includes in response to determining that the operator pattern service has permission to perform the operation, providing the request to the computing environment for the operation to be performed on the computing environment.

20 Claims, 6 Drawing Sheets

(56) References Cited

U.S. PATENT DOCUMENTS

| | | |
|---|---|---|
| 2020/0304599 A1 | 9/2020 | Kanso et al. |
| 2021/0144144 A1* | 5/2021 | Parks ..................... H04L 63/20 |
| 2022/0058047 A1* | 2/2022 | Epstein ................ H04W 84/12 |
| 2023/0153142 A1* | 5/2023 | Shabah ................ G06F 9/4881 |
| | | 718/1 |

* cited by examiner

MANAGING OPERATOR PATTERN SERVICE CONNECTIONS TO AN ENVIRONMENT

CROSS REFERENCE TO RELATED APPLICATIONS

This application is a continuation of U.S. patent application Ser. No. 17/106,411 (now U.S. Pat. No. 11,743,259), filed on Nov. 30, 2022, which is herein incorporated by reference in its entirety.

TECHNICAL FIELD

Aspects of the present disclosure relate to management of computing environments, and more particularly, managing operator pattern service connections to a computing environment.

BACKGROUND

An operator pattern service is a long-running type of software for provisioning and managing a defined state of a non-trivial application in an arbitrary environment. An operator pattern service may automate management of an environment by capturing the intent of a human operator managing the environment and providing state modifications to the environment to realize that intent.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
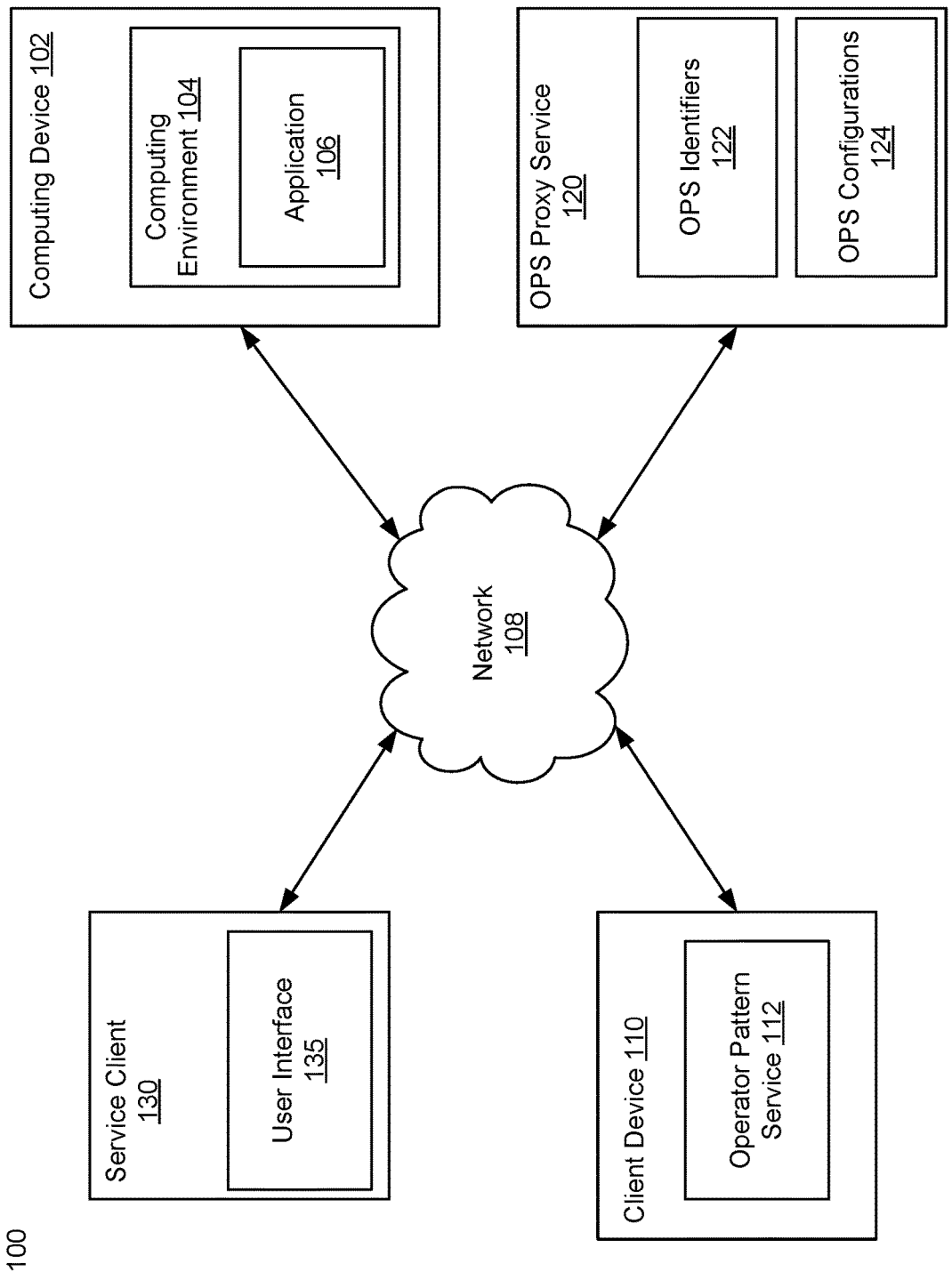
FIG. 1 is a system diagram that illustrates an example system for managing operator pattern service connections to an environment, in accordance with some embodiments of the disclosure.

As a computing environment executes, an operator pattern service (OPS) may communicate with and manage operation of the computing environment. In some instances, multiple OPSs may be in communication with the same computing environment. However, when multiple OPSs are attempting to manage the same computing environment, conflicts may arise. For example, a first OPS that is running remotely to the computing environment may modify the state of an application in the computing environment while a second OPS running within the computing environment may make conflicting modifications to the same application. In such a circumstance, the computing environment does not have visibility on the remote OPS and may only be aware of the OPS running local within the computing environment. Therefore, the computing environment may be unable to determine the source of any conflicts between modifications received from the local OPS and the remote OPS. Additionally, the computing environment may not have control of the remote OPS so the environment may be unable to stop the remote OPS from performing the modifications to the state of the application. Additionally, an OPS accessing a computing environment may cause errors to occur in the computing environment. For example, an OPS attempting to control the state of a computing environment (e.g., a container) may include a bug that is causing the computing environment to crash.

Aspects of the disclosure address the above-noted and other deficiencies by providing a service between an OPS and a computing environment for managing the OPS connection to the computing environment. The service may act as a proxy to receive, filter and forward OPS requests to the computing environment. For example, the service (hereinafter referred to as "proxy service") may receive OPS requests to perform an action (e.g., access, modify, etc.) on the state of a computing environment, or the state of an application within the computing environment. The proxy service may then forward to the computing environment only the requests that are received from an OPS that is allowed to perform the action included in the request. The OPS may be unaware of the proxy service and may continue to function as normal without modification.

In one example, after receiving a request to access a computing environment from an OPS, the proxy service may retrieve a configuration including information about whether to permit the OPS to perform one or more actions on the computing environment. For example, the information may include access permissions for each of the one or more actions (e.g., read, write, modify, etc.). For actions indicated as allowed by the access permissions, the proxy service may forward the request to the computing environment for the action to be performed. Otherwise, the proxy service may prevent the request from being forwarded to the computing environment. In other words, the proxy service may filter requests from an OPS to a computing environment based on the access permissions. Additionally, the access permissions may be managed to control connections of one or more different OPSs to the computing environment.

Advantages of the present disclosure include increased control over OPS access to computing environments. The proxy service provides for management of permissions for each individual OPS, or groups of OPSs, to access a computing environment. Furthermore, the present disclosure provides for management of OPS access without necessitating changes to the operator of the OPSs. Each OPS may continue to operate as normal without awareness of the OPS proxy service.

FIG. 1 illustrates a system 100 for managing operator pattern service (OPS) connections to a computing environment. System 100 includes a computing environment 104 executing on a computing device 102. In one example, computing environment 104 may be distributed across a cluster of computing devices. Computing environment 104 may be a software environment, such as a virtualized execution environment. In one example, computing environment 104 may be a Kubernetes™ environment or other computing environment for managing and executing an application 106, such as a container, virtual machine, or any other application. A container may be an isolated execution environment for different functions of applications. A virtual machine may be a software implementation of a machine that executes programs as though it were an actual physical machine. In one example, computing device 102 may be a server for providing virtualized execution environments, such as containers or virtual machines.

System 100 may further include an OPS 112 executing on client device 110. As depicted, the OPS 112 may be remote from the computing environment 104. However, the OPS 112 may alternatively be local to the computing environment 104. The OPS 112 may be software for managing a computing environment in a user defined manner. System 100 may also include an OPS proxy service 120 for managing OPS connections to the computing environment 104. For example, OPS 112 may send requests directed to the computing environment 104 to perform one or more actions on the computing environment 104, or on application 106 within the computing environment 104 (e.g., to perform modifications to a state of the environment or application). The OPS proxy service 120 may receive the requests from the OPS 112 and determine whether the OPS 112 has permission to perform the actions included in the request on the computing environment 104. For example, the OPS proxy service 120 may compare an identifier of the OPS 112 to OPS identifiers 122 stored at the OPS proxy service 120 (e.g., stored in a data store of the OPS proxy service 120). The identifier of the OPS 112 may be included in the request received from the OPS 112 or may be generated based on information included in the request (e.g., IP address of the OPS 112 or an http header). The OPS proxy service 120 may then retrieve a configuration from OPS configurations 124 stored at the OPS proxy service 120 based on the identifier from the request. The OPS configurations 124 may include permissions associated with one or more OPSs to access one or more computing environments associated with the OPS proxy service 120. Therefore, OPS proxy service 120 may determine from the OPS configurations 124 whether the OPS 112 has sufficient permissions to perform the operation on the computing environment 104.

System 100 further includes a service client 130 capable of interfacing with the OPS proxy service 120. Service client 130 may include a user interface 135 for displaying OPS proxy service 120 information to a user as well as receiving user modifications to the information. In one example, the service client 130 may manage one or more of the OPS configurations 124 stored at the OPS proxy service 120. Service client 130 and client device 110 may each be any type of data processing device, such as a desktop computer, a laptop computer, a mainframe computer, a personal digital assistant, a rack-mount server, a hand-held device or any other device configured to process data. Computing device 102, client device 110, OPS proxy service 120, and service client 130 may be connected by network 108. Network 108 may be any type of network such as a public network (e.g., the Internet), a private network (e.g., a local area network (LAN), Wi-Fi, or a wide area network (WAN)), or a combination thereof.

Figure 2:
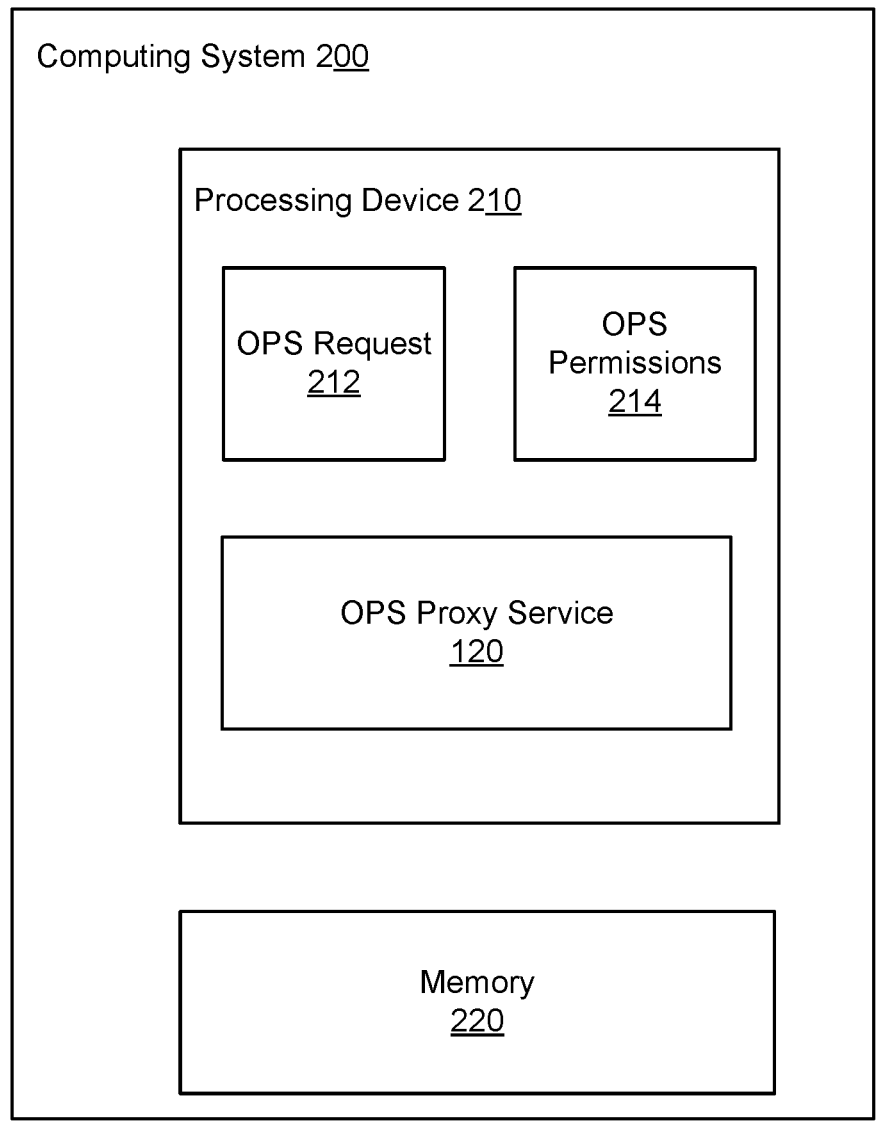
FIG. 2 is a block diagram that illustrates another example of a system for managing operator pattern service connections to an environment, in accordance with embodiments of the disclosure.

FIG. 2 is a block diagram that illustrates illustrating a computing system 200 for managing OPS connections to a computing environment. Computing system 200 may include a processing device 210 and memory 220. Memory 220 may include volatile memory devices (e.g., random access memory (RAM)), non-volatile memory devices (e.g., flash memory) and/or other types of memory devices. The processing device 210 may include an OPS request 212, OPS permissions 214, and an OPS proxy service 120. The processing device 210 may receive the OPS request 212 from an OPS. The OPS request 212 may include one or more actions to be performed on a computing environment. The OPS request 212 may further include a type of action to be performed, an identifier of the requesting OPS, and the destination computing environment. The processing device 210 may then retrieve OPS permissions 214 associated with the OPS. For example, the processing device 210 may retrieve the OPS permissions 214 based on the identifier of the OPS received in the OPS request 212.

The OPS proxy service 120 may be the same or similar to OPS proxy service 120 as described with respect to FIG. 1. The OPS proxy service 120 may receive the OPS request 212 and identify permissions associated with the OPS based on the identifier included in the OPS request 212. The OPS proxy service 120 may then determine whether the permissions associated with the OPS allow the operation from the request to be performed on the intended computing environment. If the permissions allow the operation to be performed, the OPS proxy service 120 may forward the OPS request 212 to the intended computing environment for the operation to be performed.

In one example, the OPS proxy service 120 may retrieve the access permissions from a data store associated with the OPS proxy service 120. In one example, the computing environment may be a virtualized execution environment, such as a container or virtual machine. In another example, the computing environment may be a supervisor of virtualized environments. The OPS proxy service 120 may block the request from being provided to the computing environment in response to determining that the operator pattern service does not have permission to perform the operation on the computing environment. In one example, the OPS proxy service 120 may retrieve the permissions from a data store associated with the OPS proxy service 120. The data store may include a mapping of OPS identifiers to the access permissions associated with each of the OPS identifiers.

In one embodiment, the OPS permissions may be modified by a service client. The service client may be an http client of the OPS service. For example, the OPS proxy service 120 may receive, from the service client, a modification to the access permissions associated with the operator pattern service. The OPS proxy service 120 may subsequently update the access permissions associated with the operator pattern service in view of the modification received from the service client.

Figure 3:
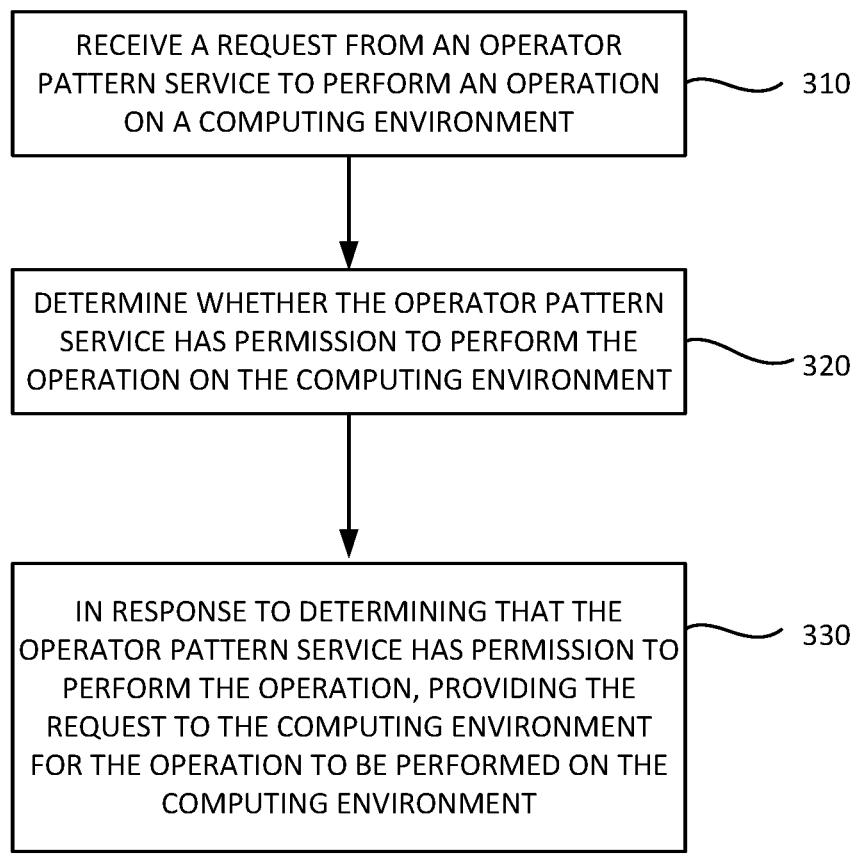
FIG. 3 is a flow diagram of a method of managing operator pattern service connections to an environment, in accordance with some embodiments of the disclosure.

FIG. 3 is a flow diagram of a method 300 of managing OPS connections to an environment, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by OPS proxy service 120 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a request from an operator pattern service (OPS) to perform an operation on a computing environment. The request may include an identifier of the operator pattern service and the computing environment. The request may include an operation to modify or otherwise access the computing environment, or applications within the computing environment. The computing environment may be a virtualized execution environment, such as a container or virtual machine. For example, the request may include an operation to modify a state of a container.

At block 320, the processing logic determines whether the OPS has permission to perform the operation on the computing environment. The processing logic may retrieve a configuration associated with the OPS to determine the permissions associated with the OPS. The configuration for the OPS may include permissions of the OPS to access one or more computing environments. For example, the processing logic may use the identifier of the operator pattern service from the request to retrieve the configuration. The processing logic may then compare the permissions of the configuration with the operation from the request to determine if the operation can be performed on the computing environment by the OPS.

At block 330, in response to determining that the OPS has permission to perform the operation on the computing environment, the processing logic provides the request to the computing environment for the operation to be performed on the computing environment. The processing logic may forward the request received at block 310 to the computer environment after determining that the OPS has the appropriate permissions. Otherwise, the processing logic may prevent the operation from being performed on the computing environment. For example, the processing logic may simply not forward the request to the computing environment if the OPS does not have the proper permissions, effectively filtering OPS access to the computing environment.

In one embodiment, a service client may manage OPS connections to the computing environment by modifying the permissions included in the OPS configurations. The service client may be an http client of the OPS proxy service. For example, the OPS proxy service may receive modifications to the access permissions associated with operator pattern services and update the permissions accordingly.

Figure 4:
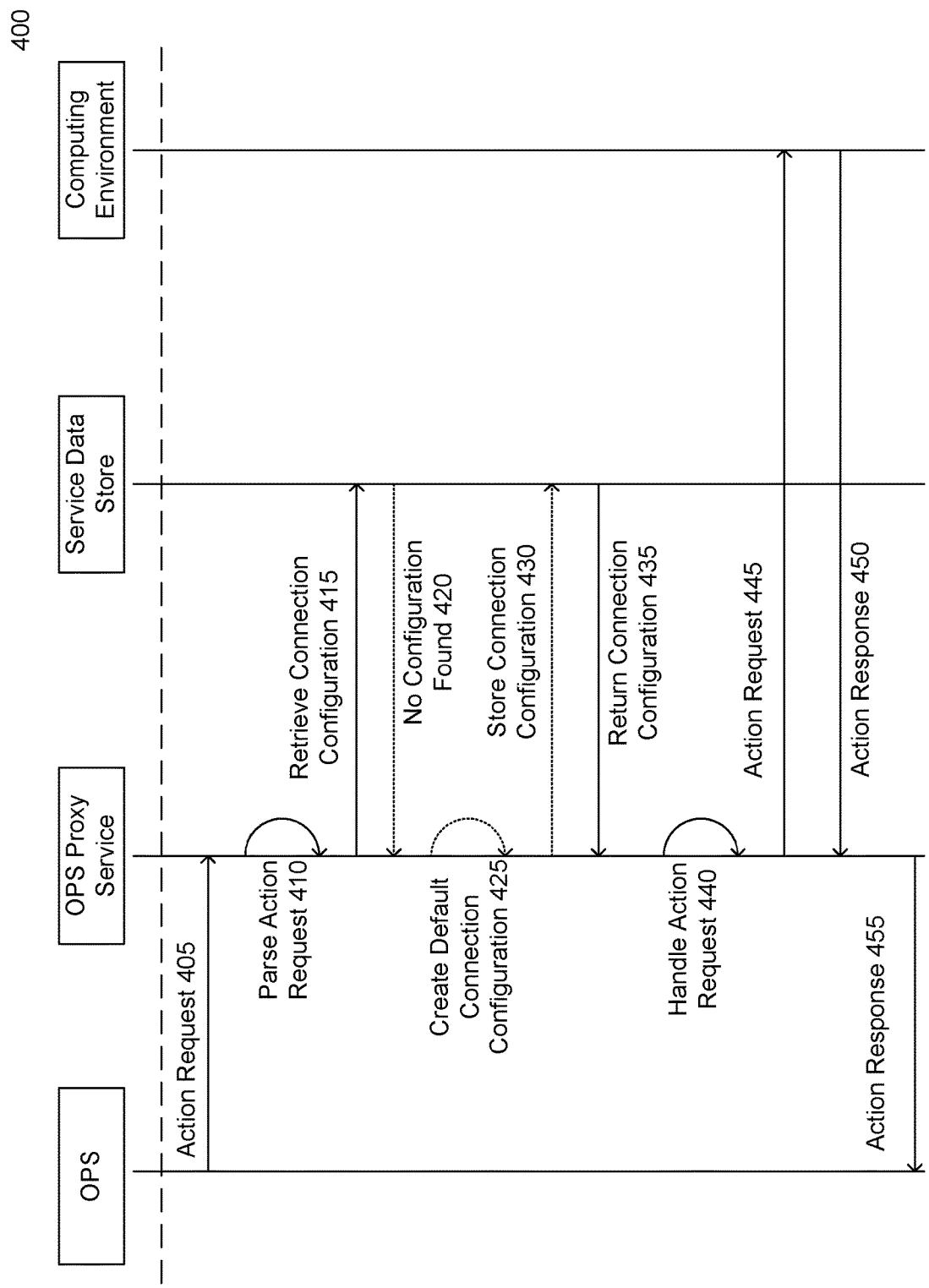
FIG. 4 depicts a flow diagram of a method of managing a proxy service for operator pattern service connections to an environment, in accordance with some embodiments of the disclosure.

FIG. 4 is a flow diagram of a of managing OPS connections to a computing environment, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed, at least in part, by OPS proxy service 120 of FIG. 1

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at step 405, where an OPS sends an action request to an OPS proxy service. The action request may include a type of action (e.g., modify, read, etc.) to be performed on a computing environment and a unique identifier of the OPS (e.g., a string). In one example, the unique identifier may be determined by the OPS proxy service based on information received from the OPS in the action request (e.g., IP address of the OPS, an http header, etc). At step 410, the OPS proxy service parses the action request. The OPS service may identify the type of action to be performed and the unique identifier of the OPS. The OPS proxy service may further identify the environment to be acted upon by the action request.

At step 415, the OPS proxy service retrieves a connection configuration from a service data store associated with the OPS proxy service. The OPS proxy service may retrieve the connection configuration using the unique identifier of the OPS. The connection configuration for the OPS may be associated with the unique identifier in the service data store. For example, the data store may include a mapping between OPS identifiers and configurations for each OPS. Accordingly, the OPS proxy service may query the service data store to determine if the service data store includes a configuration associated with the OPS. If the service data store does not include a configuration for the requesting OPS, the process continues to step 420, wherein the service data store may provide a response to the OPS proxy service that no configuration was found. Otherwise, the process continues to step 435.

At step 425, in response to the OPS receiving the response that no configuration was found for the OPS, the OPS proxy service creates a default connection configuration for the OPS. The default connection configuration may prevent the action from being forwarded to the computing environment (e.g., no access permissions). In another example, the default connection configuration provides full access to the environment by the OPS. The default connection configuration may be updated to change the permissions, as discussed in more detail below with respect to FIG. 5.

At step 430, the OPS proxy service stores the default connection configuration at the service data store. At step 435, the service data store returns the connection configuration to the OPS proxy service. At step 440, the OPS proxy service handles the action request received from the OPS. The OPS proxy service determines whether the retrieved connection configuration indicates that the OPS has sufficient permissions to perform the action included in the action request (e.g., a modification of the environment). For example, the permissions may indicate that the OPS has no access permissions, has permission to perform some actions but not all, or that the OPS has full permissions to access and modify the computing environment. The permissions may include, for example, read, write, modify, or any other permissions for accessing or modifying the computing environment. If the OPS proxy determines that the OPS has the appropriate permissions, the OPS proxy service forwards the action request to the computing environment to be performed. Otherwise, if the connection configuration indicates that the OPS does not have the permissions to perform the action from the action request, the OPS proxy service does not forward the action request.

At step 445, the OPS proxy service forwards the action request to the computing environment to be performed. At step 450, the environment provides an action response to the OPS proxy service indicating the result of the action request. At step 455, the OPS proxy service forwards the action response to the OPS.

Figure 5:
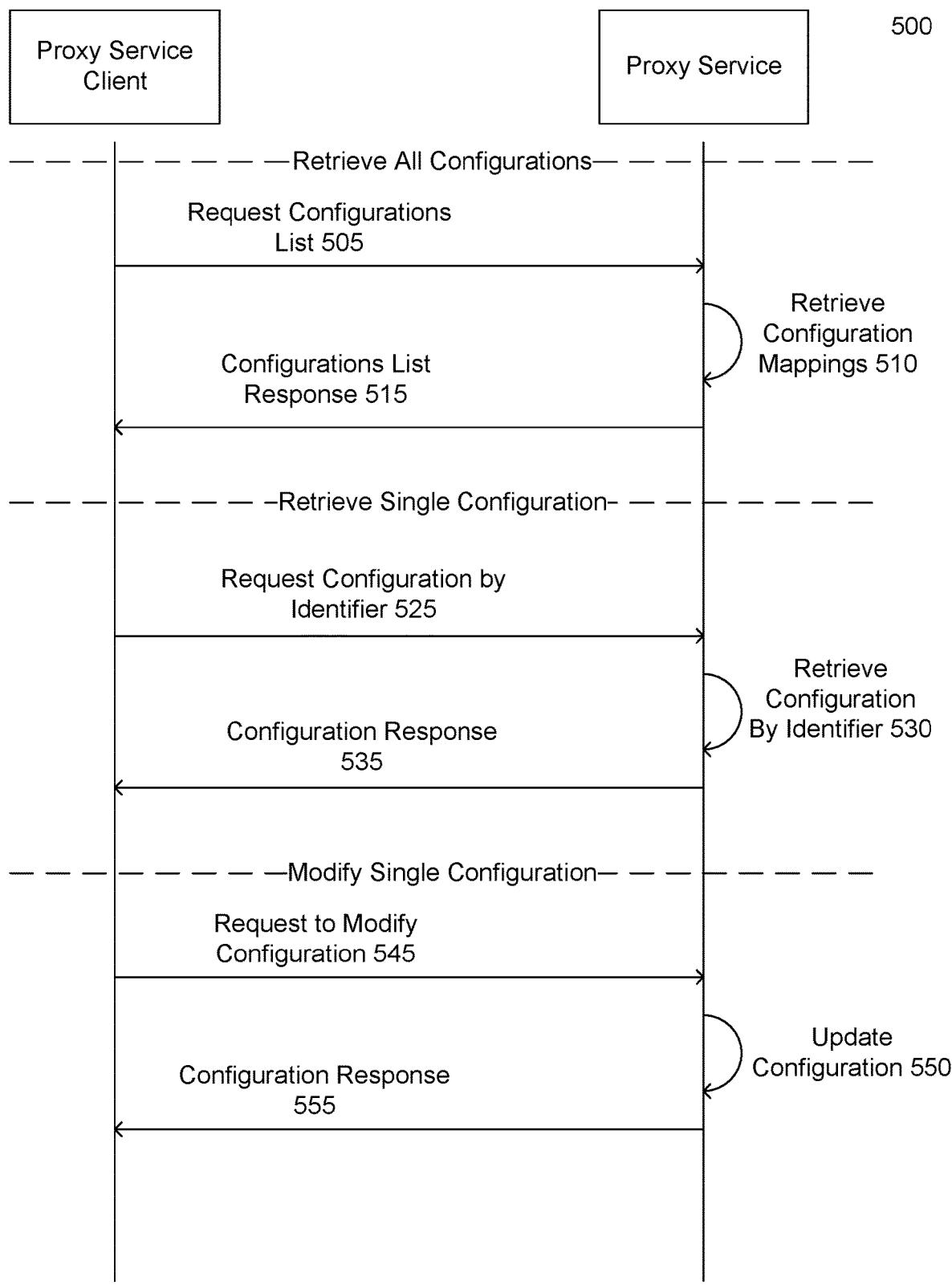
FIG. 5 is a flow diagram of a method of retrieving and modifying configurations for managing operator pattern service connections to an environment, in accordance with some embodiments of the disclosure.

FIG. 5 is a flow diagram of a method 500 of managing OPS connections to a computing environment, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by OPS proxy service 120 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 may begin at step 505 where the proxy service client sends a request to the proxy service for a list of all configurations stored at the proxy service for each OPS. At step 510, the proxy service may retrieve all configuration mappings stored at the proxy service. For example, the proxy service may retrieve each of the unique identifiers for OPSs in communication with the proxy service and the configurations associated with each unique identifier. In one example, the proxy service retrieves the configuration mappings from a data store associated with the proxy service. At step 515, the proxy service provides a response with the configurations list (i.e., a list of all the unique identifiers and configuration mappings for each unique identifier) to the proxy service client. In one example, the proxy service client may display the configurations list to a user via a graphical user interface.

In one embodiment, method 500 begins at step 525, where the proxy service client sends a request for a configuration associated with an identifier. For example, the request may include a unique identifier associated with an OPS to retrieve the configuration associated with the OPS. At step 530, the proxy service retrieves a configuration associated with the unique identifier. For example, a mapping between unique OPS identifiers and configurations for the OPSs may be stored at the proxy service, or a data store associated with the proxy service. The proxy service may identify the configuration mapping based on the unique identifier provided by the request. At step 535, the proxy service provides a configuration response. In one example, if the proxy service does not identify a mapping matching the identifier from the request, then the configuration response may indicate that the configuration was not found, or any other indication that the configuration was unavailable. Otherwise, if the proxy service identifies and retrieves a configuration for the unique identifier from the request, the configuration response includes the identified configuration.

In one embodiment, method 500 begins at step 545, where the proxy service client sends a request to the proxy service to modify a configuration at the proxy service. The request may include the modification to be performed and a unique identifier of the configuration to be modified. At step 550, the proxy service updated the configuration identified by the request based on the modification of the request. For example, the modification may be a change to access permissions of an OPS to a computing environment. At step 555, the proxy service may provide a configuration response to the proxy service client. In one example, the configuration response may include an indication that the configuration was found and the modification performed. In another example, the configuration response may include an indication that the configuration associated with the unique identifier was not found or that the modification could not be performed.

Figure 6:
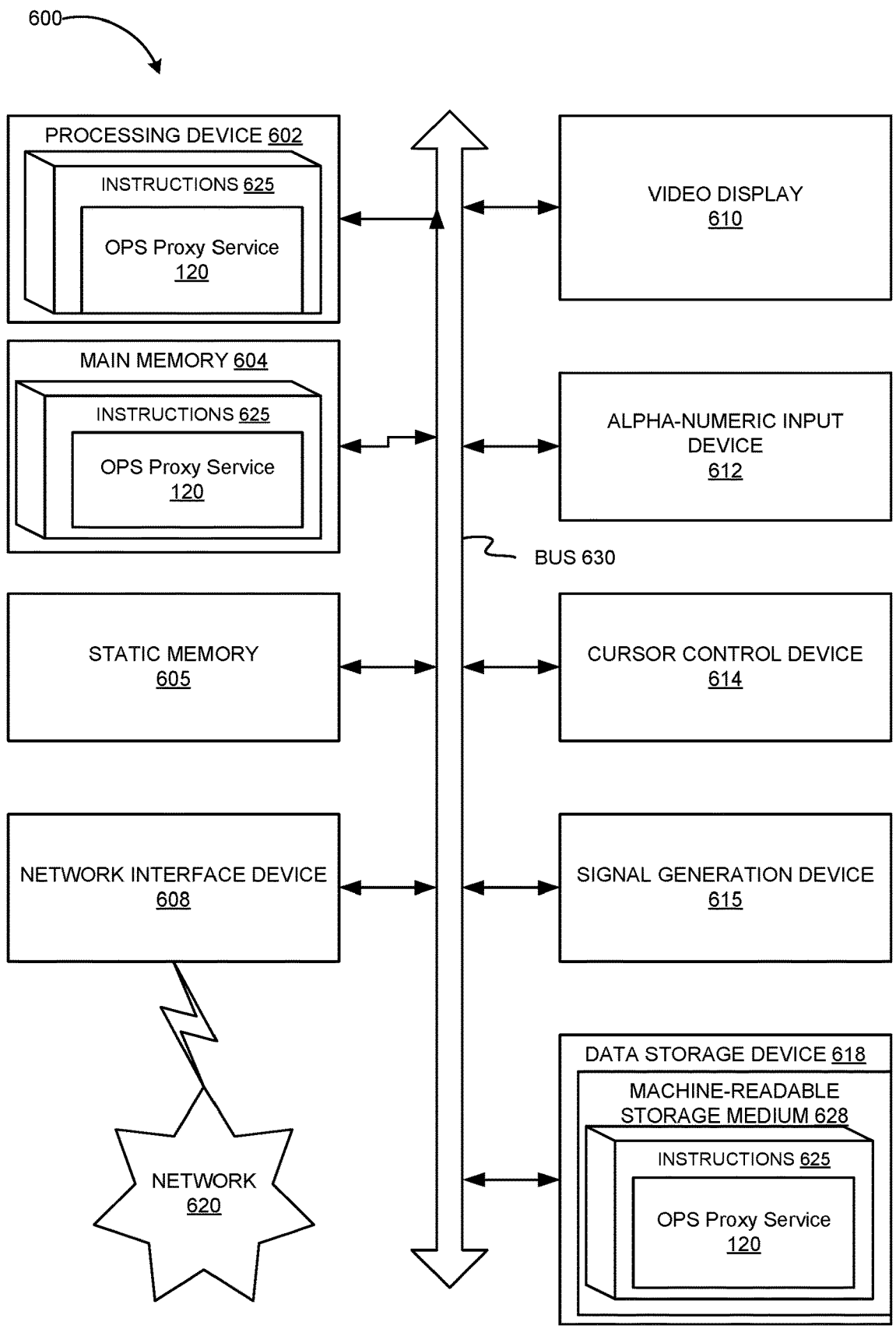
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a networking migration controller, e.g., OPS proxy service 120, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining, by a processing device, whether a software has permission to perform an operation on a state of a computing environment; and
   in response to determining that the software has permission to perform the operation, providing, by the processing device, a request to the computing environment for the operation to be performed on the state of the computing environment.

2. The method of claim 1, wherein the computing environment comprises a virtualized execution environment.

3. The method of claim 1, further comprising:
   in response to determining that the software does not have permission to perform the operation on the computing environment, blocking the request from being provided to the computing environment.

4. The method of claim 1, wherein the request comprises a type of the operation and an identifier of the software.

5. The method of claim 4, wherein determining whether the software has permission to perform the operation on the computer environment comprises:
   retrieving access permissions associated with the software operator pattern service in view of the identifier of the software; and
   determining whether the access permissions allow the software to perform the operation on the computing environment.

6. The method of claim 5, wherein the access permissions are retrieved from a data store associated with the processing device in view of the identifier, the data store comprising a mapping of the identifier of the software to the access permissions.

7. The method of claim 5, further comprising:
   receiving, from a service client, a modification to the access permissions associated with the software; and
   updating the access permissions associated with the software in view of the modification received from the service client.

8. A system comprising:
   a memory; and
   a processing device operatively coupled to the memory, the processing device to:
      determine whether a software has permission to perform an operation on a state of a computing environment; and
      in response to determining that the software has permission to perform the operation, provide a request to the computing environment for the operation to be performed on the state of the computing environment.

9. The system of claim 8, wherein the computing environment comprises a virtualized execution environment.

10. The system of claim 8, wherein the processing device is further to:
    in response to determining that the software does not have permission to perform the operation on the computing environment, block the request from being provided to the computing environment.

11. The system of claim 8, wherein the request comprises a type of the operation and an identifier of the software.

12. The system of claim 11, wherein to determine whether the software has permission to perform the operation on the computer environment the processing device is to:
    retrieve access permissions associated with the software in view of the identifier of the software; and
    determine whether the access permissions allow the software to perform the operation on the computing environment.

13. The system of claim 12, wherein the access permissions are retrieved from a data store associated with the processing device in view of the identifier, the data store comprising a mapping of the identifier of the software to the access permissions.

14. The system of claim 12, wherein the processing device is further to:
    receive, from a service client, a modification to the access permissions associated with the software; and
    update the access permissions associated with the software in view of the modification received from the service client.

15. A non-transitory computer-readable storage medium including instructions that, when executed by a processing device, cause the processing device to:
    receive, from an operator pattern service, a request to perform an operation on a state of a computing environment;
    detect a conflict between the request from the operator pattern service and another request from another operator pattern service; and
    disable a connection between the operator pattern service and the computing environment to avoid the conflict.

16. The non-transitory computer-readable storage medium of claim 15, wherein the computing environment comprises a virtualized execution environment.

17. The non-transitory computer-readable storage medium of claim 15, wherein the processing device is further to:
    in response to determining that the operator pattern service does not have permission to perform the operation, block a request for performing the operation from being provided to the computing environment.

18. The non-transitory computer-readable storage medium of claim 17, wherein the request comprises a type of the operation and an identifier of the operator pattern service.

19. The non-transitory computer-readable storage medium of claim 15, wherein the operator pattern service is configured to manage operation of the computing environment.

20. The non-transitory computer-readable storage medium of claim 18, wherein access permissions are retrieved from a data store associated with the processing device in view of the identifier, the data store comprising a mapping of the identifier of the operator pattern service to the access permissions.

* * * * *